United States Patent [19]

Williams

[11] Patent Number: 5,044,580

[45] Date of Patent: Sep. 3, 1991

[54] FLEXIBLE CLOSING DEVICE FOR A WING LEADING EDGE

[75] Inventor: Anthony J. Williams, Filton, United Kingdom

[73] Assignee: British Aerospace PLC, London, England

[21] Appl. No.: 520,821

[22] Filed: May 9, 1990

[30] Foreign Application Priority Data

May 9, 1989 [GB] United Kingdom ............... 8910654

[51] Int. Cl.⁵ ................................................ B64C 3/50
[52] U.S. Cl. .................................... 244/214; 244/130
[58] Field of Search ............................ 244/213–216, 244/211, 130, 129.4, 129.5; 89/37.19, 37.21, 1.817; 49/40; 160/102, 103, 352, 88

[56] References Cited

U.S. PATENT DOCUMENTS 2,400,322  5/1946  Wheeler ........................... 89/37.19
4,640,477  2/1987  Pace .
4,838,502  6/1989  Pinson ............................... 244/130
4,848,707  7/1989  Britton .
4,951,727  8/1990  Bybee ............................... 244/129.4

FOREIGN PATENT DOCUMENTS 2204538  11/1988  United Kingdom .

Primary Examiner—Galen Barefoot
Attorney, Agent, or Firm—Kerkam, Stowell, Kondracki & Clarke

[57] ABSTRACT

An aircraft wing leading arrangement includes a forward slat (10) movable between a stowed position and a deployed position in which a slot (13) is revealed. To prevent undesirable flow disturbances in the slot (13), a shutter device is provided for the aperture (22) in the leading edge through which the slat actuator mechanism (14) protrudes in the deployed position. This shutter device consists of a sprung (38) panel (30) of flexible material pivotally movable between aperture-blocking and aperture-unblocking positions.

4 Claims, 3 Drawing Sheets

FLEXIBLE CLOSING DEVICE FOR A WING LEADING EDGE

This invention relates to leading edge arrangements for aircraft in which a slat provided forwardly of a fixed wing portion is movable between a cruise configuration in which it lies adjacent the fixed wing portion and a high lift configuration in which it is spaced from the wing to define a slot.

Various arrangements are known for supporting the slat and controlling its attitude over its operating range of movement. These generally comprise support tracks secured to the slat at or about their forward extremities and which are slidably mounted with respect to the fixed wing portion. They may be of circular arc form such that the path followed by the slat is by definition a circular arc or, alternatively, they may be configured such that the slat can adopt optimised attitudes at selected angles of deployment in accordance with specific flight modes, e.g. cruise, take-off and landing. In any event, each spanwise section of slat is supported on two or more support tracks generally by means of a structural bolted attachment extending as a 'knuckle' from the rearward face of the slat. This 'knuckle' may further include slat adjustment means whereby the slat may be properly rigged to ensure that it achieves a smooth upper surface continuity with the fixed wing when in its stowed position.

In its stowed position, the trailing surface region of the slat which is of generally concave form lies in close proximity to the fixed wing leading edge portion of generally convex form and this fixed wing leading edge portion must be apertured to accommodate not only the support track but also the knuckle assembly. This may result in a significantly sized aperture which is an undesirable feature when the slat is deployed since it may induce undesirable flow disturbance in the slot formed between the slat and the fixed leading edge portion.

U.S. Pat. No. 4,640,477 (Pace) teaches an improvement to close an opening formed in the leading edge of an airfoil when a slat is moved to its deployed position and comprises a door which is mounted about an axis of rotation that is positioned in a vertical plane generally parallel to the movement of the slat supporting track. The axis of rotation of the door is slanted so that the door moves upwardly, rearwardly and laterally to it retracted position so as to permit the track to be retracted and when the track is extended, a spring moves the door into its deployed position to close the opening.

Our patent application GB 2,204,538A teaches an alternative arrangement of aperture closure in which a shutter is hingedly located along one edge adjacent the aperture and whose surface profile conforms substantially to the inner face of the wing leading edge portion. Preferably the shutter is of composite rubber construction and is multi-panelled having interconnecting hinge means the whole assembly of one-piece moulded construction having the desired curvature.

Our U.S. Pat. No. 4,848,707 issued July 18, 1989 and having a priority date of Dec. 19, 1987 concerns another aperture shutter arrangement which includes a pair of shutter doors having surface profiles generally conforming to the profile of the fixed leading edge and being sized, in totality, so as to be capable wholly to close the aperture; parallel motion linkage is mounted in the leading edge and is connected to the shutter doors; and springs urge the shutter doors to move between retracted and deployed positions.

The present invention represents an improvement in simplifying the known arrangements and reducing fabrication costs while improving the reliability of operation.

According to the present invention there is provided a wing leading edge arrangement for aircraft in which a slat is provided forwardly of a fixed leading edge and is movable between a retracted configuration in which it lies closely adjacent the fixed leading edge and a deployed configuration in which it is spaced from the fixed leading edge to define a slot, said slat including:

attached means to two or more substantially chordwise support tracks slidably mounted upon said leading edge portion to define said slat movement; an aperture in the leading edge skin of said fixed leading edge to accommodate said slat attachment means when said slat is in its retracted configuration; aperture closing means mounted within said fixed leading edge and movable between an aperture closing position when said slat is in its deployed configuration and a retracted position when the slat is in its stowed configuration; said aperture closing means comprising:

a) a closing panel of a flexibly foldable material having a surface area of a size to close off said apertures;

b) mounting means for locating said closing panel within said fixed leading edge adjacent said apertures; and c) actuating means effective to displace said closing panel between a retracted configuration within said fixed leading edge in which said panel is slackly folded on itself, and a fully deployed position in which said closing panel is maintained in an unfolded condition in which it is substantially and sealingly conforms to the profile of the leading edge profile over at least the area of said aperture.

One embodiment of the present invention will now be described, by way of example, and with reference to the following drawings, in which.

Figure 3:
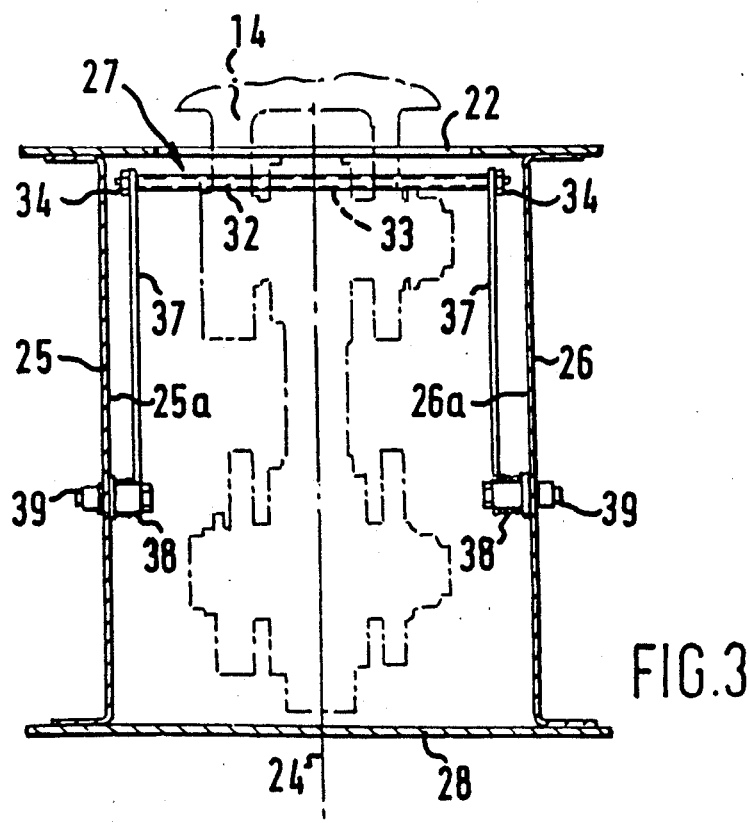
FIG. 3 is a further section through the assembly viewed in direction of arrows III—III in FIG. 1.
Figure 4:
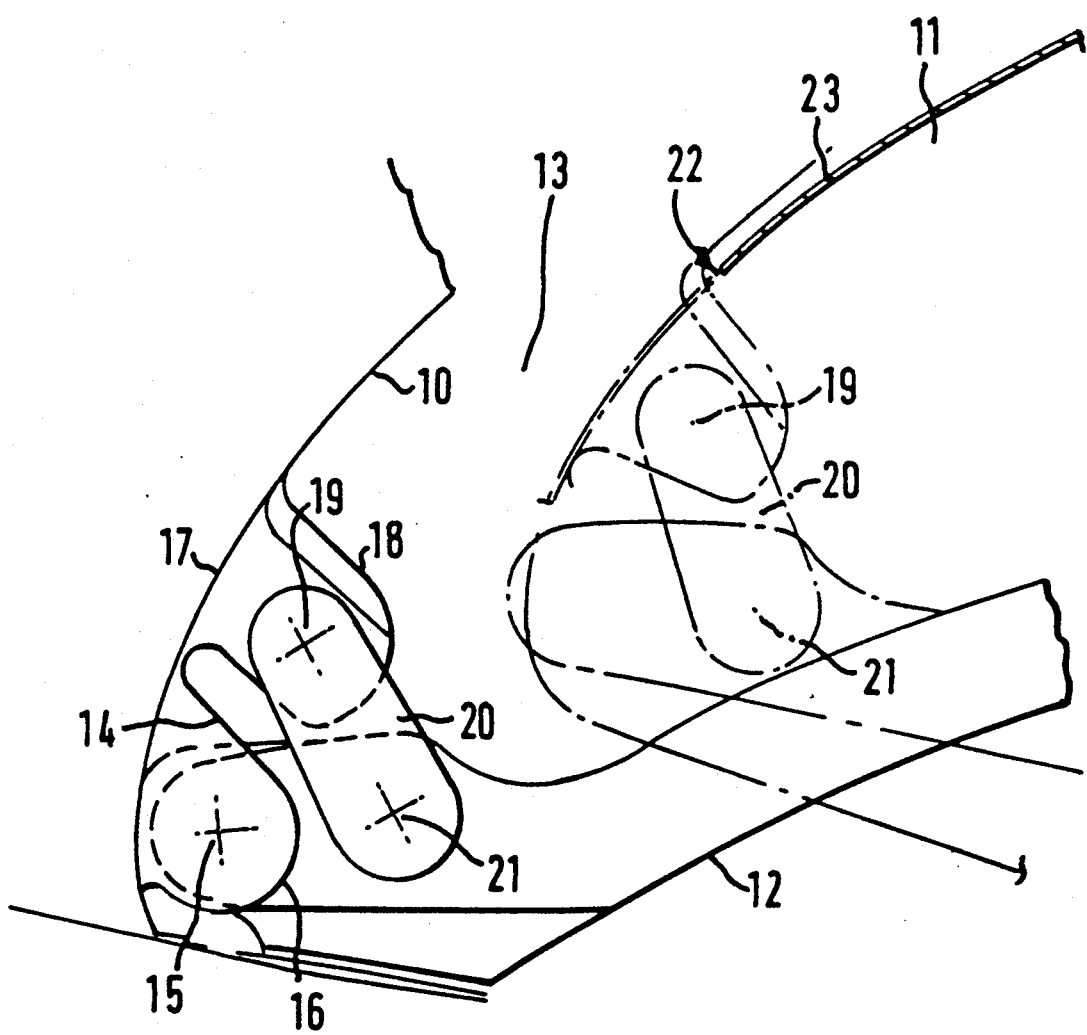
FIG. 4 illustrates diagrammaticaly, a portion of leading edge slat arrangement with the slat in deployed position with respect to the wing.

Referring to the drawings, FIG. 4 illustrates a portion of a leading edge slat 10 supported upon a fixed wing leading edge portion 11 by means of two or more substantially chordwise arcuate support tracks 12 and by which the slat is movable from a stowed position where it lies closely adjacent the fixed leading edge to conform to the wing aerodynamic profile in well-known form, (not illustrated here) to a deployed high lift position as shown, where it is placed to define a slot 13. The slat 10 is supported on the track 12 by means of a knuckle joint assembly 14. The forward extremity of the slat track 12 is configured as shown to provide a pivotal arrangement 15 to the knuckle assembly 14 and particularly a fork end fitting 16 protruding rearwardly from the slat inner profile 17. The knuckle assembly further incorporates lug 18, also protruding rearwardly from the slat inner profile 17, and providing a pivotal attachment 19 to a pair of adjuster links 20, the lower end of these links incorporating a pivotal attachment 21 to the track 12. This arrangement is particularly configured to provide, in addition to slat attachment, adjustment means for rigging the slat with correct attitude with respect to the wing profile when the slat is in retracted configuration. The detailed arrangement of this knuckle adjuster assembly is not described in detail here but it will be seen that, with the slat closed, the knuckle assembly will project into the wing fixed leading edge structure necessitating an appropriately sized aperture 22 in the leading edge skin 23. As previously discussed, the aperture may be of significant size resulting, when the slat is deployed, in undesirable flow disturbance in the slot formed between the slat and the fixed leading edge portion. The solution to this problem by means of the present invention is illustrated in FIGS. 1-3 inclusive, providing a flexible aperture closing device 27 which automatically closes off the aperture when the slat is deployed but is retracted by means of the knuckle assembly 14 engaging the device as the slat is retracted.

Figure 1:
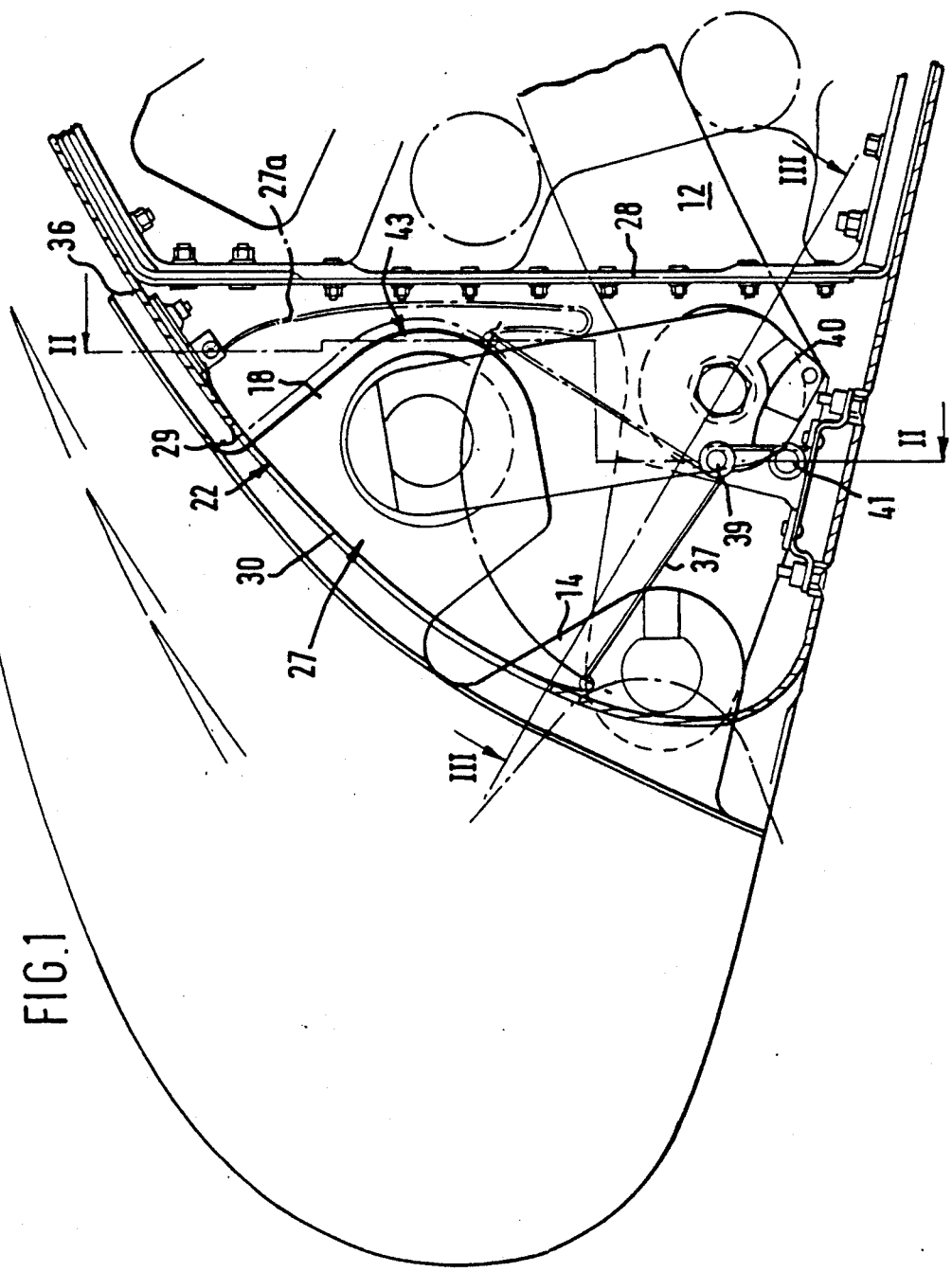
FIG. 1 is a sectional side elevation through a wing leading edge assembly in accordance with the invention.
Figure 2:
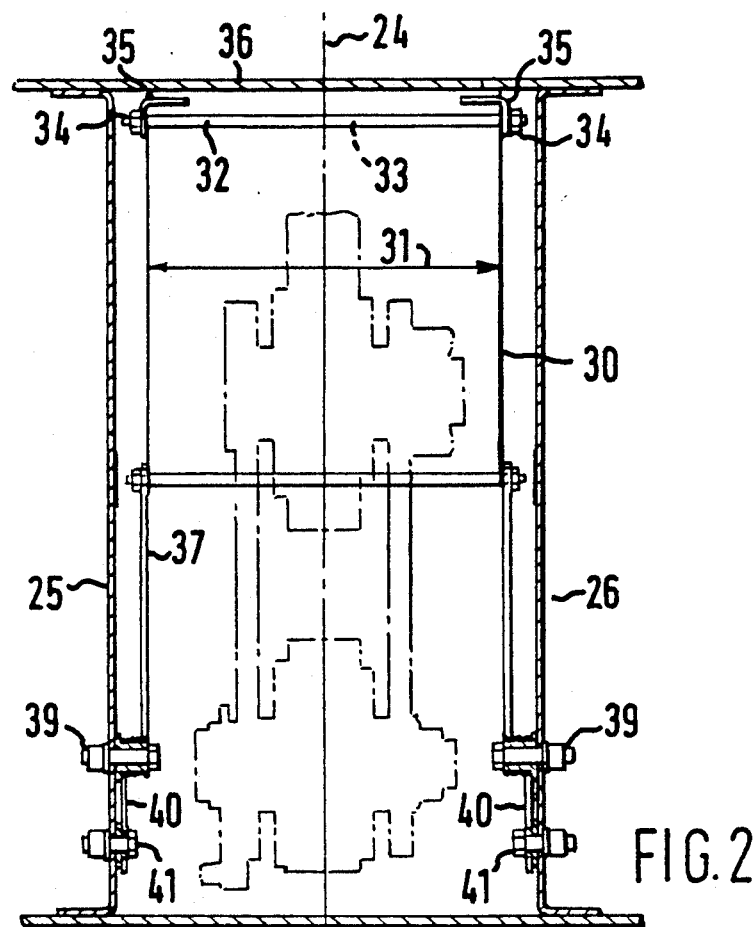
FIG. 2 is a section through the assembly viewed in direction of arrows II—II in FIG. 1.

FIGS. 1, 2 and 3 illustrate a wing leading edge structural arrangement at a typical slat arrangement position and the centre line 24 shown on FIGS. 2 and 3 corresponds to that of the slat track 12 and the knuckle assembly 14. The leading edge structural arrangement and the closure device 27 are symmetrically disposed about the centre line 24. The structure comprises a pair of leading edge riblets 25 and 26 lying forwardly of a wing spar 28 whose forward boundary profile defines the fixed leading edge portion 11 with an appropriately sized aperture 22 having an upper boundary edge 29 positioned to provide minimum clearance for the knuckle assembly 14. In the arrangement of FIG. 1 the slat 10 is shown in its stowed, i.e. the cruise position and the knuckle 14 intrudes, as previously described, into the fixed leading edge portion.

The aperture closing device 27 must be so configured that when the slat is closed it will be conveniently stowed but when the slat is opened it will automatically assume an aperture closing position. It must not, however, be possible for it to distort or assume an attitude which will prevent deployment or stowage of the slat; in other words it must not be possible to cause an obstruction.

In the present invention, the aperture closing device 27 comprises a panel 30 of flexible material of length such that it extends upwardly beyond the upper boundary edge 29 of the aperture 22 and downwardly over the required longitudinal extent of the aperture. It is of width 31 such that it overlaps the width of the aperture 22, a width determined by the dimensions of the knuckle 14 and its associated component parts and attachments. The upper extremity of the flexible panel 30 is anchored to a distance tube 32 located by means of a concentric threaded pin 33 and end nuts 34 to mounting brackets 35 fixedly mounted within the fixed leading edge skin 36. The lower extremity is similarly anchored by common parts 32, 33 and 34 to outwardly extending limbs 37, being an integral part of twin torsion springs 38 mounted to the inner faces 25a and 26a of the riblets 25 and 26 at locations 39. Reacting legs 40 of the springs 38 are fixedly located to the riblets 25 and 26 by means of attachment assemblies 41.

Referring particularly to FIGS. 1 and 4 when the slat is deployed as in FIG. 4, the flexible panel 30 conforms to the inner profile of the fixed leading edge skin 23. As the slat is retracted towards its fully closed, cruise setting, the leading edge 43 of the lug 18 makes contact with the lower panel anchorage causing angular displacement of the limbs 37 from the deployed position to the stowed position 27a indicated in chain-dot line and an associated folding of the panel. The springs 38 are torsionally loaded by the displacement so that when the slat is once again deployed the flexible panel 30 is once more automatically returned to its sealing position.

I claim:

1. A wing leading edge arrangement for aircraft in which a slat is provided forwardly of a fixed leading edge and movable between a retracted configuration in which it lies closely adjacent the fixed leading edge and a deployed configuration in which it is spaced from the fixed leading edge to define a slot, said slot including:

attachment means to two or more substantially chordwise support tracks slidably mounted upon said leading edge to define said slat movement; an aperture in the leading edge skin of said fixed leading edge to accommodate said slat attachment means when said slat is in its retracted configuration; aperture closing means mounted within said fixed leading edge and movable between an aperture closing position when the slat is in its deployed configuration and a retracted position when the slat is in its stowed configuration;

characterised in that said aperture closing means comprises:
   a) a closing panel of a flexibly foldable material having a surface area of a size to close off said apertures;
   b) mounting means for locating said closing panel within said fixed leading edge adjacent said apertures; and
   c) actuating means effective to displace said closing panel between a retracted configuration within said fixed leading edge in which said panel is slackly folded on itself and a fully deployed position in which said closing panel is maintained in an unfolded condition in which it substantially and sealingly conforms to the profile of the leading edge profile over at least the area of said aperture.

2. An arrangement according to claim 1, wherein a distance tube, a threaded pin concentric therewith and end nuts serve to anchor the upper extremity of said panel.

3. An arrangement according to claim 1 wherein said actuating means includes torsion springs fixed to wing structure; each of said springs having a first limb that is fixed to the lower extremity of said panel and is angularly displaceable, and a second limb secured to wing structure and serving as a reaction member, the arrangement being such that angular displacement of said first limb in the sense of folding said panel causes torsional loading of said springs.

4. An arrangement according to claim 3 wherein said slat is supported on said tracks by a knuckle joint assembly, a lug forming part of said knuckle joint assembly having a leading edge positioned when displaced from a deployed position of the slat to a stowed position, to come into contact with said first limb to cause angular displacement of the latter to fold said panel.

* * * * *